US011233246B2

United States Patent
Song et al.

(10) Patent No.: US 11,233,246 B2
(45) Date of Patent: Jan. 25, 2022

(54) ELECTRODE INCLUDING METAL NANOPARTICLES HAVING CONDUCTIVE POLYMER SHELL AND CONDUCTIVE FILM AND METHOD FOR MANUFACTURING THE SAME

(71) Applicants: Hyundai Motor Company, Seoul (KR); Kia Motors Corporation, Seoul (KR); Korea Advanced Institute of Science and Technology, Daejeon (KR)

(72) Inventors: You Jung Song, Gyeonggi-do (KR); Hong Seok Yun, Daejeon (KR); Jin Seong Kim, Gangwon-do (KR); Bum Joon Kim, Daejeon (KR); Young Kwon Kim, Gyeongsangbuk-do (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 172 days.

(21) Appl. No.: 16/215,010

(22) Filed: Dec. 10, 2018

(65) Prior Publication Data

US 2020/0058944 A1    Feb. 20, 2020

(30) Foreign Application Priority Data

Aug. 20, 2018 (KR) .......................... 10-2018-0096548

(51) Int. Cl.
*H01M 4/00* (2006.01)
*H01M 4/92* (2006.01)
(Continued)

(52) U.S. Cl.
CPC ......... *H01M 4/921* (2013.01); *H01M 4/8673* (2013.01); *H01M 4/88* (2013.01)

(58) Field of Classification Search
CPC .......... H01M 4/88; H01M 2008/1095; H01M 47/921; H01M 4/8673; Y02E 60/50
See application file for complete search history.

(56) References Cited

U.S. PATENT DOCUMENTS

| 2006/0083694 A1* | 4/2006 | Kodas | ................. B01J 13/0043 424/46 |
| 2008/0193827 A1* | 8/2008 | Jang | ..................... H01M 4/921 429/483 |

(Continued)

FOREIGN PATENT DOCUMENTS

KR    10-2017-0092125 A    8/2017

OTHER PUBLICATIONS

Campos et al., "Photovoltai Activity of a PolyProDOT Derivative in a Bulk Heterojunction Solar Cell", Solar Energy Materials & Solar Cells 90 (2006) 3531-3546.

(Continued)

*Primary Examiner* — Cynthia H Kelly
*Assistant Examiner* — Monique M Wills
(74) *Attorney, Agent, or Firm* — Mintz Levin Cohn Ferris Glovsky and Popeo, P.C.; Peter F. Corless

(57) ABSTRACT

Disclosed are an electrode including a polymer matrix and a catalyst including metal nanoparticles and a conductive polymer shell and, a method of preparing the same. According to various exemplary embodiments of the present invention, various hybrid nano-composites may be formed by a combination of other conductive polymers than P3HT with metal nanoparticles.

For example, the method may include selectively disposing metal nanoparticles to a surface modified conductive polymer including a block copolymer of two or more types of conductive polymers.

8 Claims, 8 Drawing Sheets

(51) Int. Cl.
*H01M 4/88* (2006.01)
*H01M 4/86* (2006.01)

(56) References Cited

U.S. PATENT DOCUMENTS

2010/0323269 A1* 12/2010 Nakai ................. H01M 4/8605
                                                  429/480
2015/0333338 A1* 11/2015 Hayden ............... H01M 4/8825
                                                  429/524

OTHER PUBLICATIONS

Iovu, M.C. et al. "Experimental Evidence for the Quasi-"Living" Nature of the Grignard Metathesis Method for the Synthesis if Regioregular Poly(3-alkylthiophenes)", Macromolecules 2005, 38, (21), 8649-8656.

Stefan et al., "Grignard Metathesis Method (GRIM): Toward a Universal Method for the Synthesis of Conjugated Polymers", Macromolecules 2009, 42, 30-32.

Hiorns et al., "High Molecular Weights, Polydispersities, and Annealing Temperatures in the Optimization of Bluk-Heterojunction Photovooltaic Cells Based on Poly(3-hexylthiophene) or Poly(3-butylthiophene)", Adv. Funct. Mater. 2006, 16, 2263-2273.

* cited by examiner

ELECTRODE INCLUDING METAL NANOPARTICLES HAVING CONDUCTIVE POLYMER SHELL AND CONDUCTIVE FILM AND METHOD FOR MANUFACTURING THE SAME

CROSS-REFERENCE TO RELATED APPLICATION

This application claims, under 35 U.S.C. § 119(a), the benefit of priority to Korean Patent Application No. 10-2018-0096548 filed on Aug. 20, 2018, the entire contents of which are incorporated herein by reference.

TECHNICAL FIELD

The present invention relates to an electrode for fuel cells including a catalyst and a conductive polymer matrix, and a method for manufacturing the same. The electrode for fuel cells may include a polymer matrix in which a catalyst including metal nanoparticles and a conductive polymer is dispersed.

BACKGROUND

A fuel cell generally has a basic structure including an anode, a cathode and a polymer electrolyte membrane. The anode includes a catalyst layer to facilitate oxidation of a fuel, and the cathode includes a catalyst layer to facilitate reduction of an oxidant. For example, in the anode, the fuel is oxidized to produce a hydrogen ion (proton) and an electron, the produced proton is transported to the cathode through the electrolyte membrane, and the electron is transported to an exterior circuit through a conductive wire. In the cathode, the proton transported through the electrolyte membrane and the electron transported to the exterior circuit through the conductive wire combine with oxygen to produce water. Accordingly, movement of electrons passing through the anode, the exterior circuit and the cathode generates electric energy. As such, the cathode and anode of the fuel cell contain a catalyst to facilitate electrochemical oxidation of a fuel and a catalyst to facilitate electrochemical reduction of oxygen, respectively. The performance of the fuel cell may be greatly affected by performances of the catalysts of the anode and the cathode. For example, a catalyst material of such electrode, platinum, which is a precious metal, has been the most generally used. The precious metal catalyst, which is the most representatively used for the anode and the cathode, has included a Pt/C catalyst including platinum metal particles supported on a carbon support having a high specific surface area and excellent electrical conductivity.

In conventional fuel cells, a platinum catalyst has been produced by reducing a combination of a platinum precursor with a carbon support and platinum may be inevitably randomly disposed in a polymer matrix.

In addition, in the related arts, there are attempts to use conductive polymer-based block copolymers as catalysts for fuel cells to improve movement of electrons. However, synthesis method for controlling nano-structures through self-assembly has not been sufficient. Technologies including synthesis of inorganic nanoparticles having conductive polymer shells and incorporation thereof into an electrode of a fuel cell having a block copolymer matrix have not been reported.

Unlike simple metal nanoparticles, hybrid nanoparticles having a shell made of an organic substance may be dispersed well in an organic solvent and thus have advantages of considerably wide surface area and excellent processability. Shells of conventional hybrid nanoparticles have include a single molecule and may be synthesized by secondarily surface-modifying with a noncrystalline polymer such as polystyrene through a ligand exchange method.

However, a process of synthesizing a conductive polymer having a functional group that can interact with metal nanoparticles may be difficult such that not metal nanoparticles having conductive polymer shells has been made. For instance, even if the conductive polymer is linked to metal nanoparticles, a purification process for removing the moiety of conductive polymer that remains non-reacted has not yet been developed. In addition, in the related arts, nanoparticles such as gold nanoparticles stably bonded to ligands have been used with limitation.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, provided are, inter alia, a method of preparing an electrode nanoparticles, by including surface-modifying nanoparticles such as gold nanoparticles and platinum nanoparticles having functions with a conductive polymer and purifying the nanoparticles, and a new method that may control the position of metal nanoparticles on an electrode for fuel cells. In particular, the electrode including a polymer matrix including a block copolymer.

In one aspect, provided is an electrode for fuel cells including a polymer matrix, and a catalyst dispersed in the polymer matrix. The catalyst may have a core-shell structure including a core including metal nanoparticles, and a shell including a conductive polymer.

The term "metal nanoparticle(s)" as used herein refers to a particle comprising one or more metal components and having a size (e.g., diameter measured at a longest length) less than about 990 nm, less than about 900 nm, less than about 800 nm, less than about 700 nm, less than about 600 nm, from about 500, less than about 400 nm, less than about 300 nm, less than about 200 nm, less than about 100 nm, or less than about 50 nm.

The term "conductive polymer" as used herein refers to a polymer having conductivity characteristics, for example, electric conductivity or thermal conductivity. Preferably, the conductive polymer may include aromatic monomers, i.e. monomers having one or more aromatic groups such as phenyl, pyrrolyl, naphthyl, or the like, which may be optionally substituted. Preferably, the conductive polymer may induce electric conductivity or metallic conductivity.

The term "polymer matrix" refers to component that comprises one or more polymers.

The core may include one or more metal components selected from the group consisting of platinum (Pt), gold (Au), tin (Sn), copper (Cu), nickel (Ni), iron (Fe), cobalt (Co), zinc (Zn), titanium (Ti), chromium (Cr), manganese (Mn), iridium (Ir), tantalum (Ta), molybdenum (Mo), rhodium (Rh), osmium (Os), rhenium (Re), tungsten (W), vanadium (V), cadmium (Cd), selenium (Se), tellurium (Te), indium (In) and silver (Ag). The metal component may suitably form a nanoparticle or particles. The core may include alloys or mixture of the metal components.

The conductive polymer may suitably include one or more selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

The catalyst may include an amount of about 80% by weight to 90% by weight of the core, and an amount of about 10% by weight to 20% by weight of the shell, based on the total weight of the catalyst.

The polymer matrix may include a block copolymer.

The term "block copolymer" as used herein may include two or more clusters of monomers, each of cluster may be a homopolymer. For instance, the block copolymer may include a first cluster (or block) consisting of "A" monomers, i.e., "A block", and a second cluster (or block) consisting of "B" monomers, i.e. "B block". The first region and the second region may be directly connected or connected via a linker group.

The block copolymer may include a copolymer of: i) one or more selected from the group consisting of polystyrene, nylon, polyethylene, polyisoprene, SBS rubber, polydicyclopentadiene, polytetrafluoroethylene, poly(phenylene sulfide), silicone, aramid, cellulose, rayon, poly(methyl methacrylate), poly(vinylidene chloride), poly(vinylidene fluoride), carbon fibers, polyisobutylene, polychloroprene, polybutadiene, poly(vinyl chloride), poly(vinyl acetate), polyvinylpyrrolidone, polycyanoacrylate, polyacrylonitrile, poly(aryleneethynylene), poly(phenyleneethynylene), polyaniline, polyphenylene, ethylene vinyl alcohol, fluoroplastic, ionomers, polyacrylate, polybutadiene, polybutylene, polyethylene, chlorinated polyethylene, polymethylpentene, polypropylene, polystyrene, polyvinyl chloride, polyvinylidene chloride, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, polyethylene terephthalate, an epoxy resin, polyurethane, polyvinylpyridine and polylactide, and ii) one or more selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

The polymer matrix may include a first region including an A block, and a second region including a B block. Preferably, the polymer matrix may have a lamellar structure in which the first region and the second region are alternately disposed.

The term "lamellar structure" as used herein refers to a structure including two or more planar structures or sheets, which may be the same or different, linearly connected. Preferably, the two or more planar structures may include the respective sheet alternately and/or repeatedly.

The catalyst may be disposed at an interface between the first region and the second region.

For example, the first region may suitably include one or more selected from the group consisting of polystyrene, nylon, polyethylene, polyisoprene, SBS rubber, polydicyclopentadiene, polytetrafluoroethylene, poly(phenylene sulfide), silicone, aramid, cellulose, rayon, poly(methyl methacrylate), poly(vinylidene chloride), poly(vinylidene fluoride), carbon fibers, polyisobutylene, polychloroprene, polybutadiene, poly(vinyl chloride), poly(vinyl acetate), polyvinylpyrrolidone, polycyanoacrylate, polyacrylonitrile, poly(aryleneethynylene), poly(phenyleneethynylene), polyaniline, polyphenylene, ethylene vinyl alcohol, fluoroplastic, ionomers, polyacrylate, polybutylene, chlorinated polyethylene, polymethylpentene, polypropylene, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, polyethylene terephthalate, an epoxy resin, polyurethane, polyvinylpyridine and polylactide; and the second region may suitably include one or more thereof selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

The electrode may include an amount of about 80% by weight to 90% by weight of the polymer matrix, and an amount of about 10% by weight to 20% by weight of the catalyst, based on the total weight of the electrode.

In another aspect, provided is a method for preparing an electrode for fuel cells. The method may include: preparing a conductive polymer using a precursor comprising an azide group and a thiol group and a first polymer represented by the following Formula 1:

$$R^1-C\equiv C,\qquad\text{[Formula 1]}$$

wherein the conductive polymer is represented by the following Formula 2:

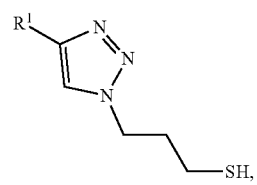

[Formula 2]

wherein $R^1$ in Formula 1 or Formula 2 is a polymer comprising a block copolymer; preparing nanoparticles having a core-shell structure comprising a core of metal nanoparticles and a shell comprising the conductive polymer; preparing a catalyst by purifying the nanoparticles; and admixing the catalyst and a block copolymer to prepare a polymer matrix in which the catalyst is dispersed.

The precursor may suitably include 3-azido-1-propanethiol.

Preferably, the conductive polymer of Formula 1 may be prepared using a Grignard metathesis (GRIM) polymerization method.

The polymer matrix may suitably include: a first region comprising an A block; and a second region comprising a B block. Preferably, the polymer matrix may have a lamellar structure in which the first region and the second region are alternately disposed. The catalyst may be disposed at an interface between the first region and the second region.

For example, the first region may suitably include one or more selected from the group consisting of polystyrene, nylon, polyethylene, polyisoprene, SBS rubber, polydicyclopentadiene, polytetrafluoroethylene, poly(phenylene sulfide), silicone, aramid, cellulose, rayon, poly(methyl methacrylate), poly(vinylidene chloride), poly(vinylidene fluoride), carbon fibers, polyisobutylene, polychloroprene, polybutadiene, poly(vinyl chloride), poly(vinyl acetate), polyvinylpyrrolidone, polycyanoacrylate, polyacrylonitrile, poly(aryleneethynylene), poly(phenyleneethynylene), polyaniline, polyphenylene, ethylene vinyl alcohol, fluoroplastic, ionomers, polyacrylate, polybutylene, chlorinated polyethylene, polymethylpentene, polypropylene, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, polyethylene terephthalate, an epoxy resin, polyurethane, polyvinylpyridine and polylactide; and the second region may suitably include one or more thereof selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

Preferably, $R^1$ may include suitably one or more selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

The metal nanoparticles may suitably include one or more selected from the group consisting of platinum (Pt), gold (Au), tin (Sn), copper (Cu), nickel (Ni), iron (Fe), cobalt (Co), zinc (Zn), titanium (Ti), chromium (Cr), manganese (Mn), iridium (Ir), tantalum (Ta), molybdenum (Mo), rhodium (Rh), osmium (Os), rhenium (Re), tungsten (W), vanadium (V), cadmium (Cd), selenium (Se), tellurium (Te), indium (In) and silver (Ag).

The method may further include adding a solvent component including tetrahydrofuran (THF) and hexane to remove a conductive polymer by-product. The conductive polymer by-product may not participate in synthesis reaction with the metal nanoparticles. In addition, the solvent component may be used to purify the catalyst as a synthesis reaction product.

A ratio of THF to hexane of the solvent component may be of about 1:1.2 to 1:2.0.

The catalyst may be dispersed in the polymer matrix by microwave annealing both the block copolymer and the catalyst at a temperature of about 150 to 200° C. for about 5 minutes to 30 minutes, for example by using a microwave.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
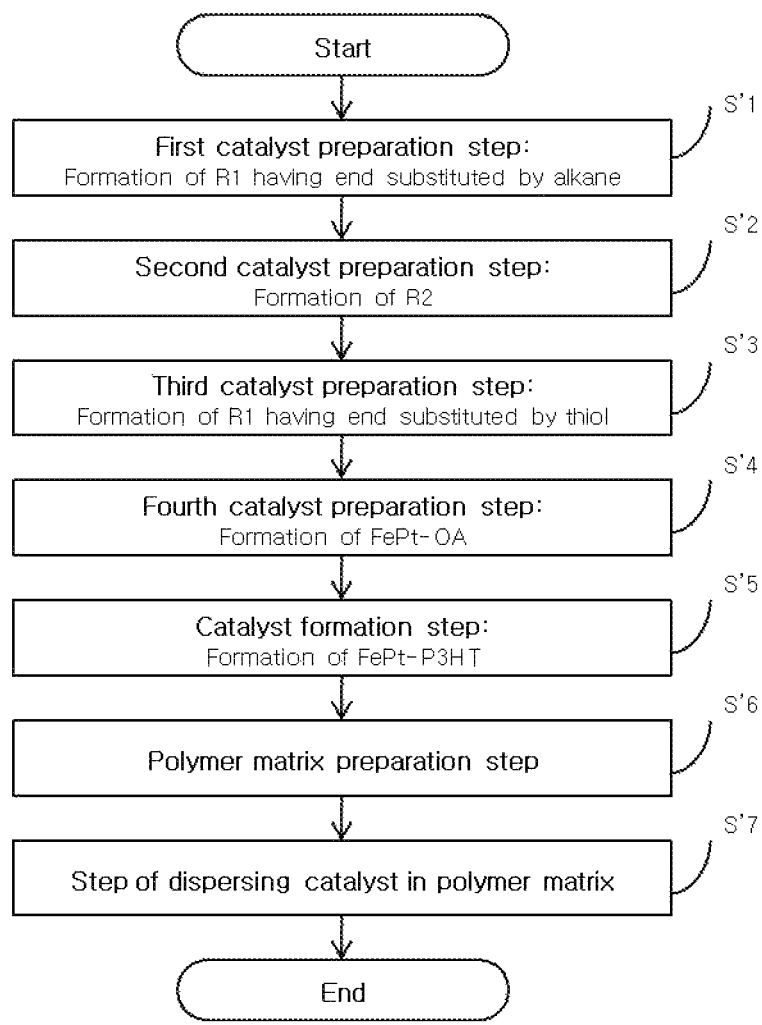
FIG. 1 shows exemplary processes of preparing an exemplary electrode including polymer matrix a catalyst having a core-shell structure dispersed in the polymer matrix, according to an exemplary embodiment of the present invention.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed context and sufficiently inform those skilled in the art of the technical concept of the present invention.

It will be further understood that the terms "comprises" and/or "has", when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that when an element such as a layer, film, region or substrate is referred to as being "under" another element, it can be directly under the other element or an intervening element may also be present.

As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments and examples of the present invention will be described in detail with reference to the annexed drawings, but the present invention is not limited to the embodiments, examples and drawings.

The present invention relates to an electrode for fuel cells including a catalyst with a core-shell structure including metal nanoparticles and a conductive polymer. The catalyst may be dispersed at a controlled position on a conductive polymer matrix including an A-b-B-type block copolymer.

The catalyst of the present invention may include the metal nanoparticles as a core and the conductive polymer as a shell.

The metal nanoparticles constituting the catalyst may suitably include one or more selected from the group consisting of platinum (Pt), gold (Au), tin (Sn), copper (Cu), nickel (Ni), iron (Fe), cobalt (Co), zinc (Zn), titanium (Ti), chromium (Cr), manganese (Mn), iridium (Ir), tantalum (Ta), molybdenum (Mo), rhodium (Rh), osmium (Os), rhenium (Re), tungsten (W), vanadium (V), cadmium (Cd), selenium (Se), tellurium (Te), indium (In) and silver (Ag). The metal nanoparticles may include an alloy or a mixture of the metal components. Preferably, the metal nanoparticles may suitably include one or more selected from the group consisting of CuPt, CoPt$_3$, PtNi, CuPd, FePt and CuAu. Preferably, the metal nanoparticles may include iron-platinum (FePt). However, nanoparticles are not limited thereto and any substance may be used so long as it can serve as a catalyst for fuel cells.

According to the present invention, the size of the metal nanoparticles may suitably range from about 2 to about 30 nm depending on reduction temperature of a metal precursor and amount of ligand.

The conductive polymer may suitably include one or more selected from the group consisting of polytriphenylamine, polyacetylene (PA), polythiophene (PT), poly(3-alkyl) thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexylthiophene) (P3HT), polycarbazole, and polyaniline (PANI). Preferably, a thiophene polymer such as polythiophene [poly(3-hexylthiophene, P3HT)] may be preferably used. However, the conductive polymer is not limited thereto and any substance may be used so long as it basically has electrical conductivity and includes the nanoparticles and the core-shell structure according to the present invention.

Hereinafter, a method for preparing the catalyst according the present invention will be described with reference to formulas and drawings. In an exemplary embodiment, the method for preparing the catalyst using FePt as metal nanoparticles, which may constitute a core for the catalyst, and P3HT as a conductive polymer, which may constitute a shell. This is provided only for better understanding and should not be construed as limiting the scope of the present invention.

FIG. 1 shows a flowchart illustrating exemplary processes of preparing a polymer matrix in which a catalyst with a core-shell structure may be suitably dispersed.

In a first catalyst preparation step (S'1), a conductive polymer surrounding metal nanoparticles serving as a catalyst is prepared. In this step, a conductive polymer R$^1$ having an end substituted by alkyne may be formed.

In a second catalyst preparation step (S'2), a precursor material R2, which reacts with the alkyne substituted on the end of R1 formed in step (S'1) to replace the end of R1 with thiol, may be formed.

In a third catalyst preparation step (S'3), the conductive polymer R1 having an end substituted by alkyne of step (S'1) may react with the precursor material R2 of step (S'2), to form a conductive polymer R1 having an end substituted by thiol.

In a fourth catalyst preparation step (S'4), metal nanoparticles (e.g., FePt) stabilized with oleic acid and oleylamine may be prepared.

In a catalyst formation step (S'5), the metal nanoparticles stabilized in step (S'4) may react with the conductive polymer R1 having an end substituted by thiol formed in step (S'3) to synthesize a metal catalyst with a core-shell structure having a structure in which the conductive polymer surrounds metal nanoparticles, and the metal catalyst may be then purified.

In a polymer matrix preparation step (S'6), a block copolymer, that serves as a base for providing a matrix, in which the metal catalyst formed in step (S'5) is dispersed, and includes a conductive polymer may be prepared.

In a step of dispersing a catalyst in a polymer matrix (S'7), the metal catalyst of step (S'5) may be mixed with the block copolymer of step (S'6) and a matrix, in which the metal catalyst is dispersed, may be provided using a microwave annealing method, for example, microwave annealing both the block copolymer and the catalyst.

Hereinafter, details of respective steps will be described with reference to an example in which the metal nanoparticles are FePt and the conductive polymer is P3HT.

Step 1: Preparation of
2,5-dibromo-3-hexylthiophene monomer

A 2,5-dibromo-3-hexylthiophene monomer may be prepared as a starting material to obtain poly(3-hexylthiophene-2,5-diyl (hereinafter, referred to as "P3HT") as a conductive polymer.

The monomer of the present invention may be variably selected depending on the type of used conductive polymer. For example, 2,5-dibromo-pyrrole, 2,5-dibromo-1-octyl-pyrrole or the like is used as the monomer to obtain polypyrrole or the like. A 2,5-dibromo derivative monomer may be polymerized in order to substitute by alkane in the following step.

Step 2: Polymerization of Polymer Having End Substituted by Alkane

In order to activate the functional group of the polymer end, Grignard metathesis (hereinafter, referred to as "GRIM") polymerization may be conducted using a solution of nickel catalyst dissolved in a solvent.

The GRIM polymerization of symmetric monomer may be described in, for example, the documents [Campos et al., Photovoltai Activity of a PolyProDOT Derivative in a Bulk Heterojunction Solar Cell, Solar Energy Materials & Solar Cells, August 2006] and [Iovu, M. C. et al. Macromolecules 2005, 38, (21), 8649-8656], [Macromolecules 2009, 42, 30-32] and [Adv. Funct. Mater. 2006, 16, 2263-2273].

High purity tetrahydrofuran (hereinafter, referred to as "purity 99.9% THF") may be mixed with the monomer prepared in step 1 under a nitrogen atmosphere at a temperature of about 0° C. Isopropyl magnesium chloride may be slowly added to the mixture and the resulting mixture may stand at room temperature for 3 hours for thorough reaction.

A dispersion of dichloro(1,3-bis(diphenylphosphino)propane)nickel (hereinafter, referred to as "Ni(dppp)Cl$_2$") in THF may be quickly added to the reaction mixture, followed by reaction for about 30 minutes.

The length (molecular weight) of P3HT chains may be controlled by the amount of used nickel catalyst.

For end substitution reaction, the reaction solution may be reacted with alkyne magnesium chloride (hereinafter, referred to as "ethynylMgCl"), and the reaction may be ceased by addition of excess methanol to obtain poly(3-hexylthiophene) (hereinafter referred to as "P3HT") substituted by alkyne.

The polymerization reaction may be depicted by the following reaction scheme.

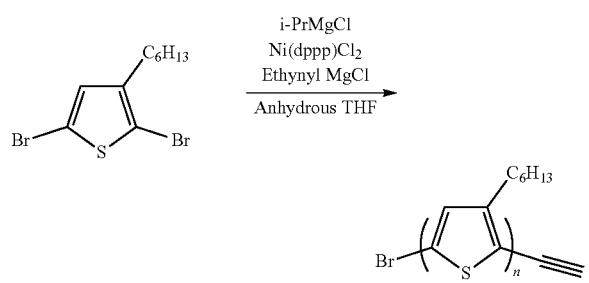

Step 3: Synthesis of Precursor Having Two Ends of Azide and Thiol

Chloropropanethiol (3-chloro-1-propanethiol, hereinafter, referred to as "CClS") as a starting material may be added to and dissolved in dimethylformamide (hereinafter referred to as "DMF"), followed by degassing.

A mixture of sodium azide (hereinafter referred to as "NaN$_3$") with DMF may be subjected to ultrasonic decomposition at about 50 W for about 30 minutes to thoroughly dissolve NaN$_3$ and then the solution may be reacted with CClS dissolved in DMF. At this time, preferably, the reaction may be carried out at a temperature of about 60° C. for about 8 hours.

In order to remove excess NaN$_3$ left behind after reaction, the reaction solution may be extracted with dichloromethane (hereinafter, referred to as "DCM") to obtain an azidopropanethiol (3-azido-1-propanethiol, C$_3$H$_7$N$_3$S) precursor having two ends of azide and thiol.

The process may be depicted by the following reaction scheme.

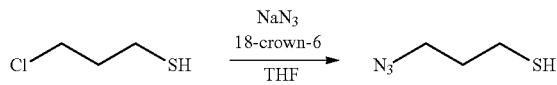

Step 4: Synthesis of poly(3-hexylthiophene-2,5-diyl (Hereinafter, Referred to as "P3HT") Conductive Polymer Having End of Thiol P3HT having an end substituted by alkane, polymerized in step 2 may be mixed with the C$_3$H$_7$N$_3$S precursor obtained in step 3 in a ratio of about 4:1 to 6:1, highly concentrated THF may be added to the resulting mixture, one equivalent of copper (I) bromide (CuBr) and one equivalent of N"-pentamethyldiethylenetriamine (hereinafter, referred to as "PMDETA") may be added thereto, nitrogen bubbling is conducted and reaction may be conducted in a microwave reactor. The reaction may be preferably carried out in the microwave reactor at a temperature of about 60° C. for about 2 hours.

After reaction, CuBr and PMDETA added as reaction catalysts may be removed, and C$_3$H$_7$N$_3$S that remains unreacted may be removed to obtain a P3HT conductive polymer having an end substituted by thiol.

The process may be depicted by the following reaction scheme.

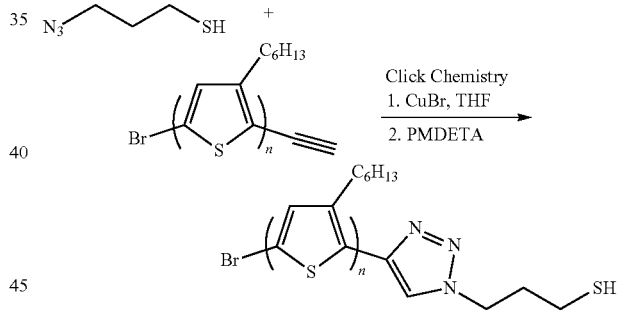

Step 5: Synthesis of FePt Metal Nanoparticles

High-temperature pyrolysis nanoparticle synthesis may be used to synthesize iron-platinum (FePt) metal nanoparticles with a uniform size.

2,4-pentanedione platinum (II) (hereinafter, referred to as "Pt(acac)$_2$"), 1,2-hexadecanediol and benzyl ether ((C$_6$H$_5$CH$_2$)$_2$O) may be mixed and reacted while heating under vacuum. At this time, after heating to a temperature of about 100° C., the vacuum condition may be maintained for about 30 minutes to maximize removal of moisture and oxygen.

After reaction, oleic acid and oleylamine may be added and reflux may be conducted at high-temperature for about 30 minutes. At this time, applied temperature may preferably be of about 280 to 300° C.

After heat treatment, the reaction mixture may be cool to room temperature and centrifugation may be conducted with ethanol to obtain a precipitate.

The obtained precipitate may be dispersed in hexane and centrifugation may be conducted with ethanol again. At this time, centrifugation may be preferably carried out at a rotation rate of about 3,000 rpm for about 2 minutes, and the process may be preferably repeated two or more times.

The precipitate obtained by the process may be finally dispersed in hexane or toluene, and oleic acid and oleylamine may be added thereto to stabilize FePt nanoparticles.

The process corresponds to (M1) of FIG. 1, which shows that FePt nanoparticles may be stabilized by an oleylamine shell.

Step 6: Catalyst Synthesis and Purification

The FePt nanoparticles (hereinafter, referred to as "FePt-OA" or "FePt-OA nanoparticles") stabilized in step 5 and P3HT obtained in step 4 may be each dispersed in THF.

The P3HT solution may be added to the FePt-OA nanoparticle solution under a nitrogen atmosphere by a syringe. At this time, the reaction may be preferably carried out at a temperature of about 40° C. for about 12 hours.

Figure 2:
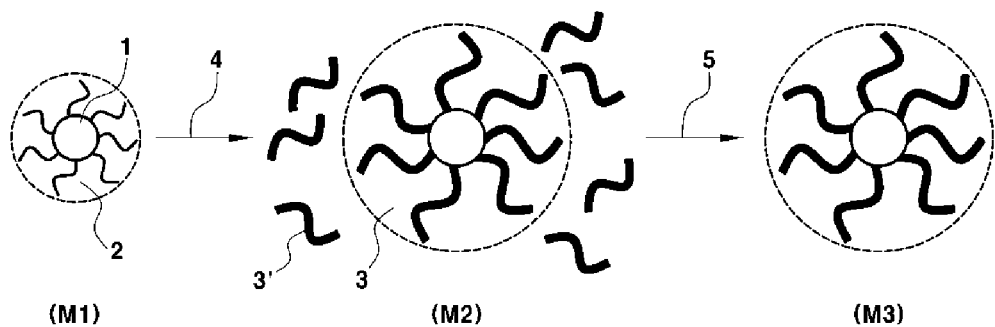
FIG. 2 shows an exemplary process for preparing an exemplary catalyst with a core-shell structure according to an exemplary embodiment of the present invention.

The process is shown in (M1) and (M2) of FIG. 2. For instance, FePt-P3HT may be obtained by adding P3HT having a thiol end to the stabilized FePt nanoparticles.

After reaction, in order to remove unreacted P3HT residues, a solution of THF and hexane in a ratio of 1:1.2 to 1:2.0 may be added and P3HT may be removed using a centrifuge at a rotating speed about 8,000 rpm for about 10 minutes to obtain a FePt-P3HT core-shell structure nanocomposite material (hereinafter, referred to as "catalyst", "FePt-P3HT nanoparticles" or "FePt-P3HT catalyst"). The nickel catalyst added in step 2 may determine the molecular weight of the conductive polymer P3HT constituting the FePt-P3HT nanoparticles. Since the number of conductive polymers of the shell linked to one core is limited, as molecular weight increases, the weight of the shell may increase.

The core according to an exemplary embodiment of the present invention, e.g., FePt, may be present in an amount of about 70 to 95% by weight, and the shell according to an exemplary embodiment of the present invention, P3HT, may be present in an amount of about 5 to 30% by weight, based on the total weight of the catalyst. When the molecular weight of P3HT is suitably controlled, P3HT may be present in an amount of about 10 to 20% by weight, and FePt may be present in an amount of about 85 to 90% by weight, and P3HT is present in an amount of 10 to 15% by weight, based on the total weight of the catalyst. Preferably, a ratio of THF to hexane may be about 1:1.3 to 1:1.8, or particularly about 1:1.4 to 1:1.6. When the ratio of THF to hexane is less than about 1:1.2, precipitation may not occur entirely, which causes deterioration in effectiveness of separation, and when the ratio is greater than about 1:2.0, P3HT, which is the conductive polymer material remaining unreacted, may be precipitated together, which makes separation impossible.

As can be seen from (M2) and (M3) of FIG. 2, P3HTs remaining unreacted may be removed by centrifugation.

Purification may be conducted with ethanol in accordance with conventional methods. On the other hand, according to an exemplary embodiment of the present invention, centrifugation may be conducted in a solvent component including THF and hexane in order to separate and purify the conductive polymer 3 that reacted with FePt, and the conductive polymer 3' that remains unreacted therewith.

The conductive polymer matrix for forming an electrode may include an A-b-B-type block copolymer.

In the block copolymer, A may suitably include poly(2-vinylpyridine) (hereinafter, referred to as "P2VP"), and B may suitably include the same material as the conductive polymer constituting the catalyst of the present invention.

The conductive polymer matrix for forming an electrode may have a structure in which a domain including A (=A block or first region) and a domain including B (=B block or second region) may be divided. Preferably, the conductive polymer matrix may have a layered (lamellar) structure in which a domain including A and a domain including B may be alternately disposed.

The method for preparing a conductive polymer matrix according to the present invention will be described in detail.

The conductive polymer matrix of the present invention may have a certain-shape domain. When self-assembly of the block copolymer is used, a matrix with a several nanometer-scaled minute domain size may be obtained. Preferably, annealing may induce self-assembly of the block copolymer. Conventionally known annealing methods include thermal annealing, solvent annealing and solvothermal annealing.

For example, microwave annealing which is one form of solvothermal annealing may be used. When another method than solvothermal annealing is used for the process of inducing self-assembly of a conductive polymer-based block copolymer such as P3HT, conditions enabling chains of the conductive polymer to be freely moved may not be satisfied and thus desired conductive polymer matrixes may not be formed.

For example, during thermal annealing, two polymers constituting the block copolymer for a long time may be heated to a melting point or greater. Since the melting point of the conductive polymer is relatively high and, in particular, is higher than a degradation temperature of other blocks, other polymers than the conductive polymer may be decomposed, which makes experimentation impossible.

For this reason, according to the present invention, microwave annealing which is one solvothermal annealing method, that may induce self-assembly without heating to a high temperature may be used. The solvent used for microwave annealing may swell the polymer increase degree of freedom of chains to widen a processing window, greatly reduce conventional long annealing times, and enable relatively low temperature processes to greatly reduce structural defect rates in morphologies.

Conductive Polymer Matrix Including Catalyst

Figure 3:
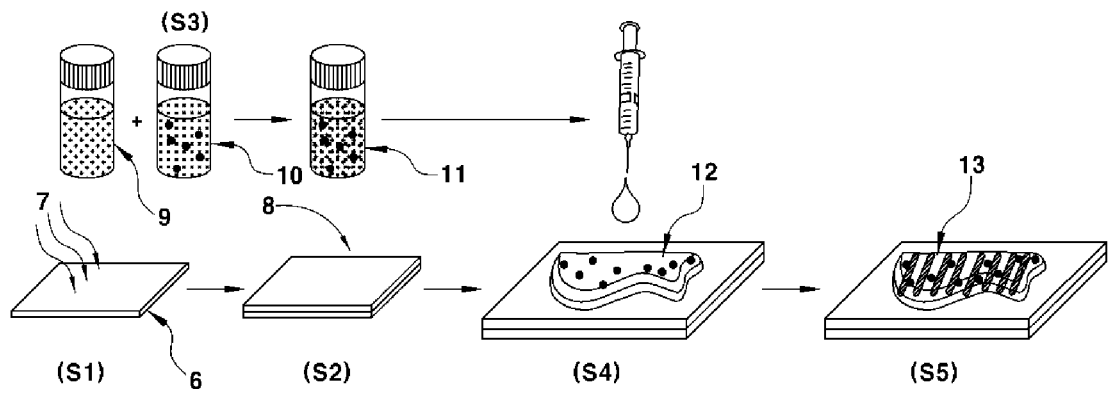
FIG. 3 shows an exemplary process of producing a film of an exemplary block copolymer and iron-platinum (FePt) nanoparticles and an exemplary process of microwave annealing.

FIG. 3 shows an exemplary process of preparing an exemplary conductive polymer matrix and steps of dispersing an exemplary catalyst in an exemplary conductive polymer matrix.

First, poly(sulfonyl sulfate) (PSS) used as an interlayer material to separate silicon wafer from a polymer sample may be dissolved in distilled water and the resulting mixture may be stirred for one day.

The silicon wafer may be hydroxylated by oxygen plasma treatment (S1) and then may be spin-coated with the prepared interlayer material dope (S2).

A block copolymer used as a conductive polymer matrix may be dissolved in chloroform, and the catalyst (=FePt-P3HT nanoparticles) synthesized above may be mixed with this solution. At this time, the catalyst may be present in an amount of about 5 to 20 wt % of the block copolymer, or particularly of about 10 to 15 wt % thereof (S3), based on the total weight of the copolymer. When the ratio of platinum oxide is less than about 5 wt %, reactivity as the catalyst may be insufficient, and when the ratio is greater than about 20 wt %, dispersibility may be deteriorated due to interaction between catalysts.

The reaction mixture prepared in step (S3) may be drop-cast on a PSS-coated silicon wafer (S4).

The silicon wafer obtained in step (S4) may be dipped in a microwave vial containing 1 ml of tetrahydrofuran (THF) capable of effectively dissolving materials constituting the block copolymer and annealed at a temperature of about 180° C. for about 10 minutes to obtain a conductive polymer matrix containing a catalyst.

According to the present invention, the completed conductive polymer matrix may have a lamellar structure in which two regions, i.e., a domain including a P3HT conductive polymer (first region) and a domain including a P2VP polymer (second region) may be alternately disposed in the form of a layer. Preferably, the catalyst may be disposed at the interface between the first region and the second region.

Regarding a fuel cell, the most basic unit to generate electricity is a membrane electrode assembly (MEA), which includes an electrolyte membrane and an anode and a cathode formed at two surfaces of the electrolyte membrane. At the anode, oxidation between hydrogen or methanol, a fuel, for example, a hydrocarbon such as butane, occurs to produce a hydrogen ion ($H^+$) and an electron ($e^-$), and the hydrogen ion is moved through the electrolyte membrane to the cathode. At the cathode, the hydrogen ion transported through the electrolyte membrane reacts with an oxidant such as oxygen and an electron to produce water. Through this reaction, the electron is moved to an exterior circuit.

A membrane electrode assembly for fuel cells includes an electrolyte membrane, and a cathode and an anode which face each other via the electrolyte membrane. The cathode includes a cathode catalyst layer and a cathode gas diffusion layer disposed sequentially from the electrolyte membrane, and the anode includes an anode catalyst layer and an anode gas diffusion layer disposed sequentially from the electrolyte membrane.

The polymer matrix, in which the catalyst is dispersed, according to an exemplary embodiment of the present invention, may be included in at least one of the cathode catalyst layer and the anode catalyst layer in the membrane electrode assembly, which may provide an electrode material having a structure in which three phases including P3HT enabling movement of electrons, P2VP enabling movement of ions and FePt serving as a catalyst contact one another.

EXAMPLE

Hereinafter, the present invention will be described in more detail with reference to Preparation Examples and Examples. However, the present invention is not limited to the following Preparation Examples and Examples.
<Preparation Example 1> Preparation of FePt-P3HT Catalyst
Preparation Example 1-1:Polymerization of polythiophene [(poly(3-hexylthiophene), P3HT)] Having End Substituted By Alkane 2 g of a 2,5-dibromo-3-hexylthiophene monomer was charged in a 2-neck round bottom (RB) flask, vacuum was applied for 30 minutes to remove oxygen and moisture and a nitrogen atmosphere was created.

Then, the residue was stirred in 40 mL of distilled high-purity tetrahydrofuran (THF) (purity 99.9% or more) at a temperature of about 0° C. In addition, 3 mL (0.98 equivalent) of isopropyl magnesium chloride (2M) was slowly added thereto.

To induce sufficient reaction with a monomer, reaction was conducted at room temperature for 3 hours and a dispersion of 73.1 mg of a dichloro(1,3-bis(diphenylphosphino)propane)nickel (Ni (dppp)$Cl_2$) catalyst in 3 mL of THF was quickly added to the reaction solution. After reaction for 30 minutes, 4 mL of alkyne magnesium chloride (0.5M) was quickly added thereto for end-capping. After 5 minutes, excess methanol was added to cease reaction and the polymer was obtained by filtration. In order to remove monomer and catalyst residues that remain unreacted, washing with methanol was conducted several times. Through this step, 832 mg (81.6% yield) of P3HT having an alkane end with a molecular weight of 1.5 kg/mol could be obtained.

Figure 4:
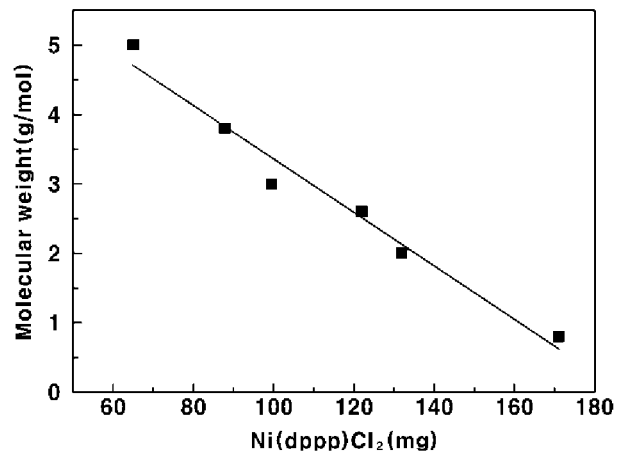
FIG. 4 shows correlation between molecular weight of a P3HT polymer having an alkane end and amount of nickel (Ni) catalyst, based on 2 g of a P3HT monomer.

At this time, correlation between the molecular weight of P3HT and the amount of nickel catalyst, based on 2 g of 2,5-dibromo-3-hexylthiophene monomer, is shown in FIG. 4. As can be seen from FIG. 4, as amount of the nickel catalyst increases, the molecular weight of P3HT increases.
Preparation Example 1-2:Synthesis of Precursor Having Two Ends of Azide and Thiol 500 mg of 3-chloro-1-propanethiol was dissolved in 10 mL of dimethyl formamide (DMF) and, for degassing, a long syringe was applied to a flask and nitrogen was injected for 30 minutes. 8 equivalents (1.2 g) of sodium azide was thoroughly dissolved in 20 mL of DMF by ultrasonic decomposition at 50 W for 30 minutes. In addition, the sodium azide dissolved DMF was added to the 3-chloro-1-propanethiol dissolved DMF, followed by conducting reaction at a temperature of 60° C. for 80 hours.

In order to remove excess sodium azide left behind after reaction, the following extraction was conducted.

Figure 5:
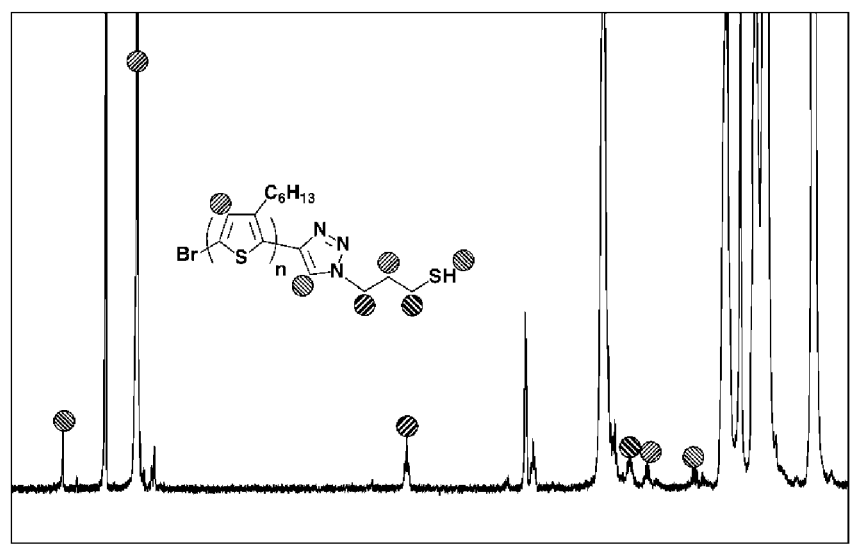
FIG. 5 shows analysis results of a nuclear magnetic resonance ($^1$H-NMR) spectrum of polythiophene (P3HT) having a thiol end.
Figure 6:
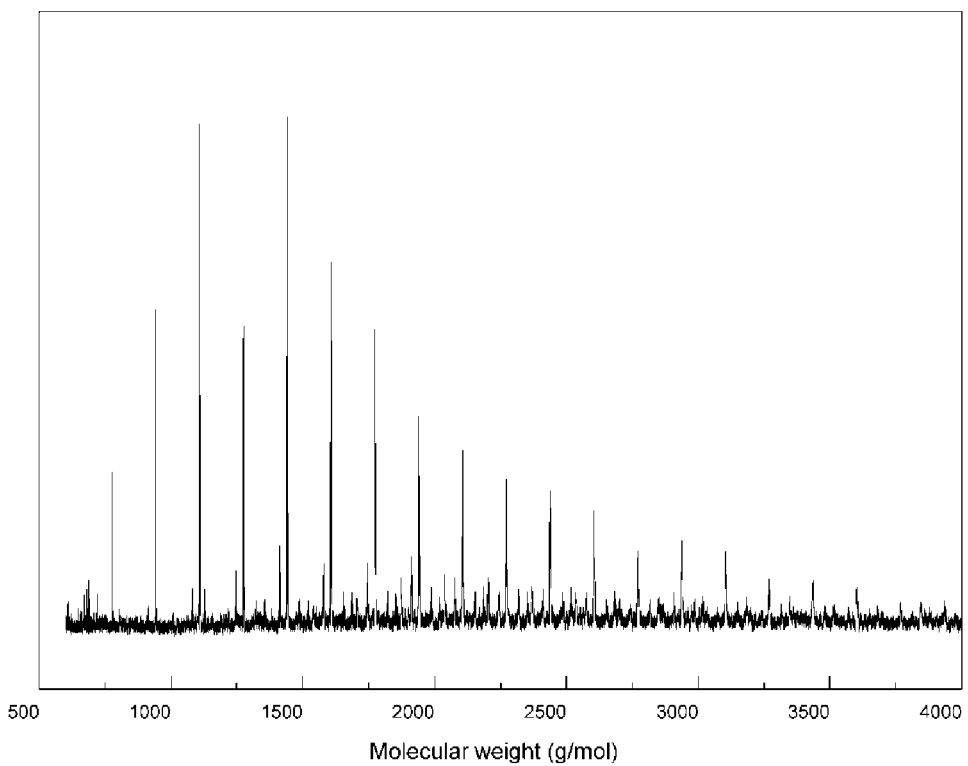
FIG. 6 shows analysis results of a matrix-assisted laser desorption/ionization (MALDI) spectrum of polythiophene (P3HT) having a thiol end.

First, in order to change from DMF to another solvent, the resulting product was dissolved in 300 mL of excess dichloro methane (DCM), 100 mL of a small amount of DI-water was added and only DCM was extracted. This process was repeated three or more times to remove sodium azide. The DCM residue was evaporated to obtain a transparent liquid product.
Preparation Example 1-3: Synthesis of P3HT Conductive Polymer Having Thiol End 200 mg of P3HT having an end substituted by alkane, previously polymerized in (Preparation Example 1-1) and 35.3 mg of the precursor having two ends of azide and thiol, polymerized in (Preparation Example 2) were dipped in a 20 mL microwave vial. In addition, copper (I) bromide (CuBr) was added in an amount of 1 equivalent, which was the same as moles of alkane of P3HT, 10 mL of tetrahydrofuran (THF) was added to the resulting mixture, the inlet of the vial was sealed and nitrogen bubbling was conducted for 1 hour to maximize removal of oxygen and moisture in the solvent. Then, 1 equivalent of N"-pentamethyldiethylenetriamine (PMDETA) was added, nitrogen bubbling was further conducted for 5 minutes, reaction was proceeded at a temperature of 60° C. for about 2 hours in a microwave reactor and the reaction was then ceased. In order to remove CuBr, the reaction mixture was diluted in excess THF, filtered through an aluminum oxide column, concentrated and precipitated with methanol, and a product was obtained while removing remaining catalysts and excess 3-azido-1-propanethiol. Completion of synthesis and purification can be seen from analysis results of nuclear magnetic resonance (NMR) of FIG. 5. In addition, measurement results of matrix-assisted laser desorption/ionization (MALDI) shown in FIG. 6 showed that the molecular weight was about 1.5 kg/mol.

Preparation Example 1-4: FePt Nanoparticle Synthesis

High-temperature pyrolysis nanoparticle synthesis was used to synthesize FePt nanoparticles with a uniform size.

Figure 7A:
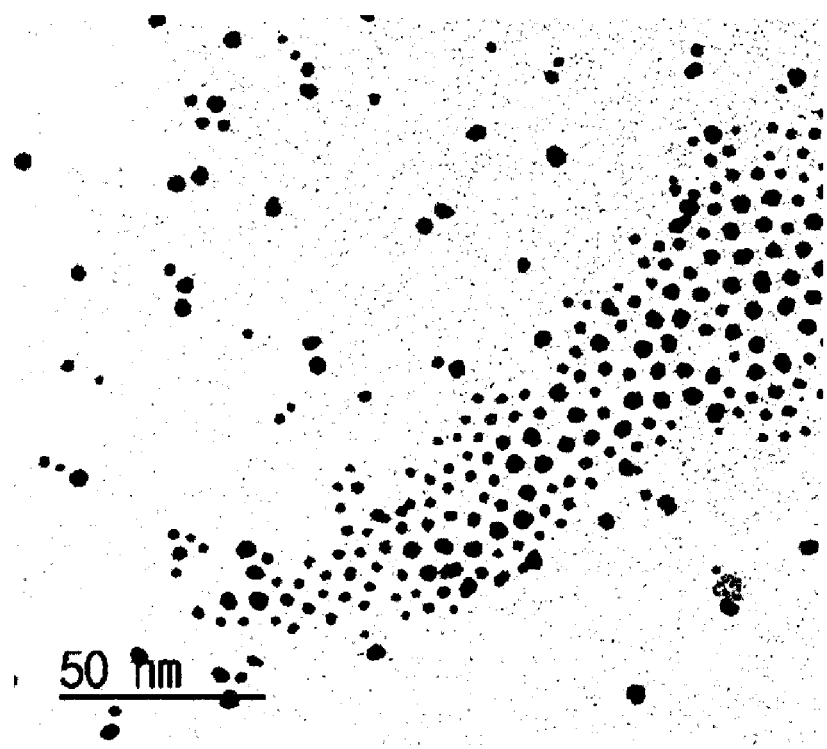
FIG. 7A is a TEM image of FePt-OA immediately before and after FePt synthesis.

197 mg (0.5 mmol) of platinum (II)acetylacetonate, 20 mml of benzyl ether and 390 mg (1.5 mmol) of 1,2-hexadecanediol were stirred in a three-neck flask. The resulting mixture was heated under vacuum to 100 degrees, and moisture and oxygen were removed as much as possible while maintaining the vacuum condition for about 30 minutes. Then, the flask was filled with nitrogen and reflux was conducted in 0.16 mL (0.5 mmol) of oleic acid and 0.17 L (0.5 mmol) of oleylamine to an elevated temperature of 290° C. After allowing to stand at a temperature of 290° C. for 30 minutes, a heating mantle was removed. When the temperature was dropped to room temperature, 40 mL of ethanol was charged in a centrifuge tube and centrifugation was conducted at 3,000 rpm for 2 minutes to collect a nanoparticle precipitate. The precipitate was dispersed in about 10 mL of hexane again, and the dispersion was centrifuged in 15 mL of ethanol at 3,000 rpm for 2 minutes. This process was further conducted about twice, the final precipitate was finally dispersed in 5 mL of hexane or toluene, and the resulting dispersion was kept in 50 µl of oleic acid and 50 µl of oleylamine. A transmission electron microscope (TEM) image of the obtained FePt (=FePt-OA) is shown in FIG. 7A, which shows that it is present in the form of an about 3 nm nanoparticle.

Preparation Example 1-5: Synthesis and Purification of Core-Shell Structure (Hybrid) Catalyst In order to surface-modify the FePt (=FePt-OA) nanoparticles synthesized in (Preparation Example 1-4) and stabilized with oleylamine and oleic acid, ligand exchange was conducted by the following process.

20 mg of FePt (=FePt-OA) nanoparticles was dispersed in 10 mL of THF and then oxygen was removed by nitrogen bubbling for 30 minutes. In addition, 200 mg of P3HT having a thiol-propyl end synthesized in (Preparation Example 1-3) was dissolved in 20 mL of THF and nitrogen bubbling was conducted for 30 minutes. The P3HT solution was added to the FePt (=FePt-OA) nanoparticle solution under a nitrogen atmosphere by a syringe and reaction was conducted at a temperature of 40° C. for 12 hours to prepare an FePt-P3HT catalyst.

In order to remove P3HT left behind after reaction, the FePt-P3HT catalyst was centrifuged in THF and hexane in a ratio of 1:1.5 at 8,000 rpm for 10 minutes to separate out the precipitate.

Figure 8:
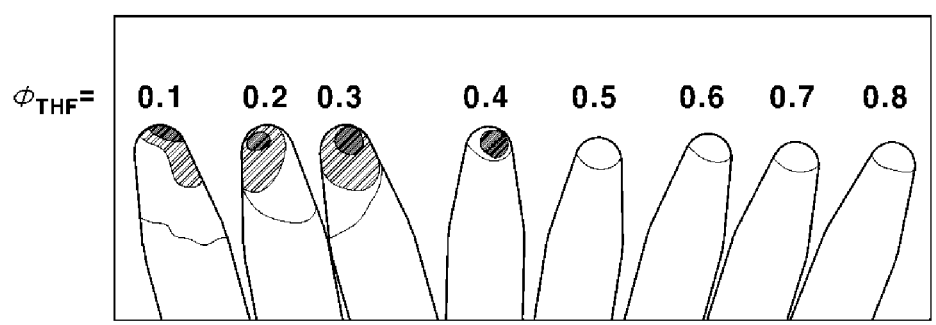
FIG. 8 shows centrifugation results depending on ratio of tetrahydrofuran (THF) and hexane of the solvent component.

FIG. 8, which shows whether or not separation is conducted well at various THF rates ($\Psi_{THF}$), shows separation is conducted well at $\Psi_{THF}$ of 0.3 to 0.4.

Figure 7B:
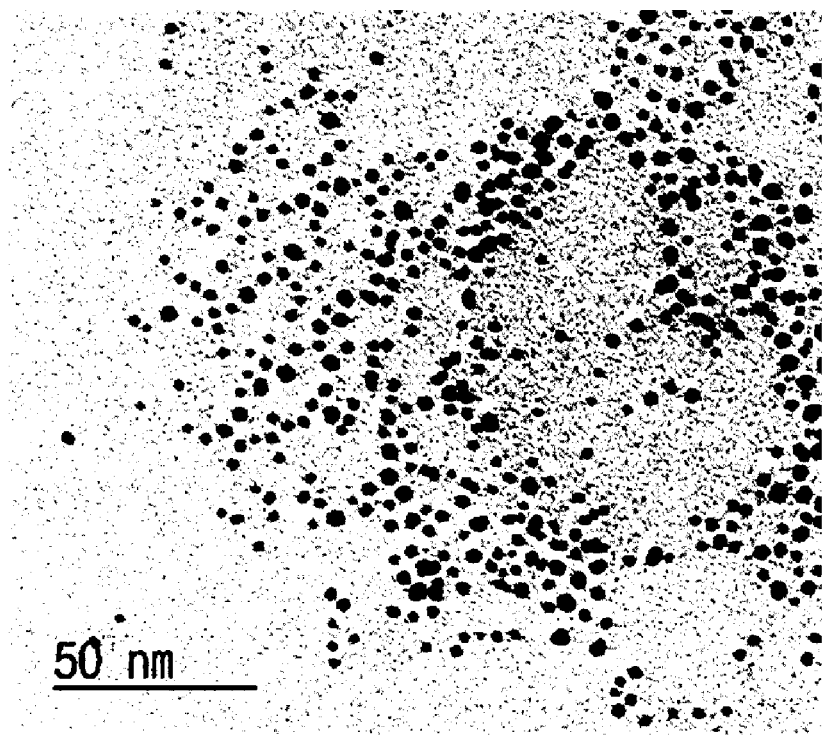
FIG. 7B is a TEM image of FePt-P3HT after ligand exchange.

The TEM image of the FePt-P3HT catalyst prepared by the reaction is shown in FIG. 7B.

When considering dispersion structures of nanoparticles shown in FIGS. 7A and 7B, FIG. 7A shows that the nanoparticles partially have a hexagonal close-packed structure, whereas FIG. 7B shows that the distance between the nanoparticles is wide and the nanoparticles are randomly distributed.

Figure 9:
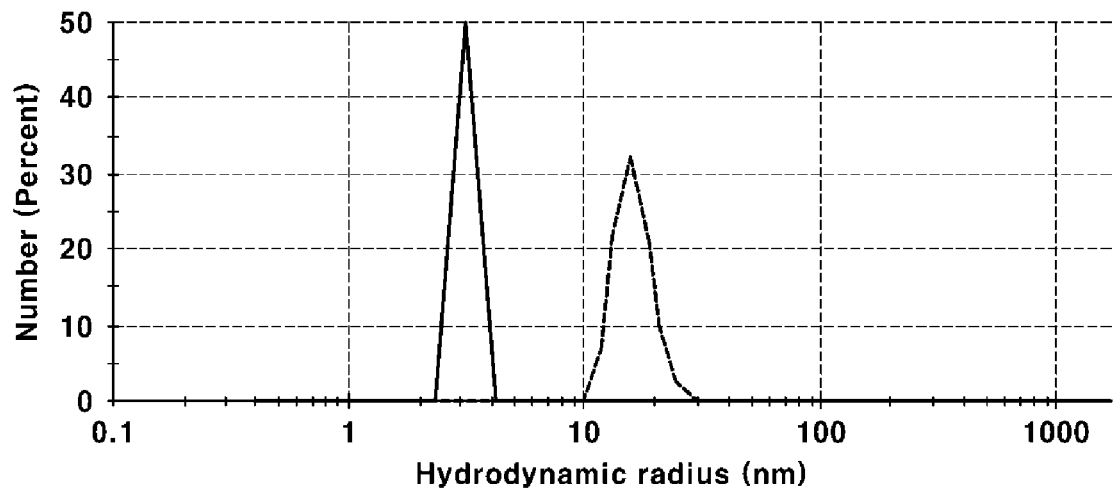
FIG. 9 is a dynamic light scattering (DLS) graph of FePt before and after ligand exchange.
Figure 10:
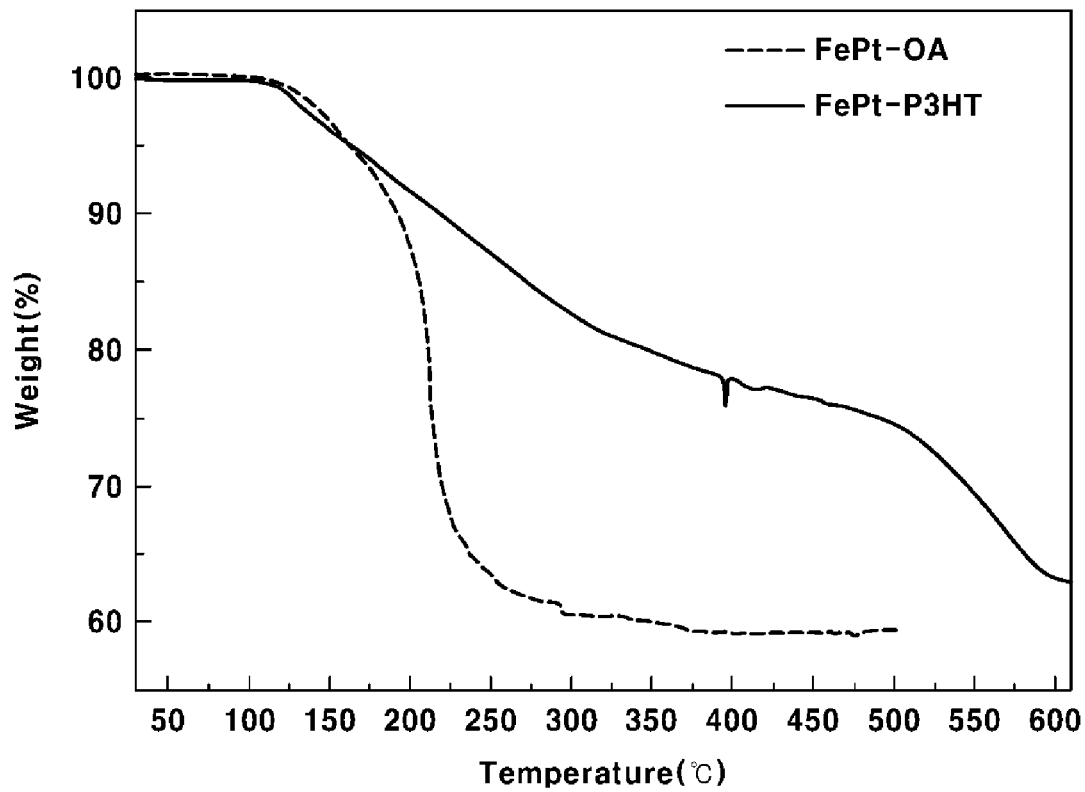
FIG. 10 is a graph of thermogravimetric analysis (TGA) of FePt before and after ligand exchange.

In order to identify that FePt-OA is converted into FePt-P3HT well by ligand exchange in (Preparation Example 1-5), DLS (dynamic light scattering) and TGA (thermogravimetric analysis) are conducted and results shown in FIGS. 9 and 10.

As can be seen from FIG. 9, the hydrodynamic radius is increased after reaction, which means that ligand exchange into a polymer is conducted. The hydrodynamic radius was 10 nm to 30 nm when ligand exchange is conducted from FePt-OA to FePt-P3HT.

As can be seen from FIG. 10, the weight (curve) is dropped at a temperature of about 450° C. at which P3HT starts to decompose, which shows that P3HT is present in an amount 20 wt % of ingredients of the catalyst.

<Preparation Example 2> Preparation of Conductive Polymer Matrix Including FePt-b-P3HT Block Copolymer Poly(sulfonyl sulfate) (PSS) used as an interlayer material to a separate silicon wafer from a polymer sample was dissolved at a concentration of 10 mg/mL in distilled water and the resulting mixture was stirred for one day.

The silicon wafer was hydroxylated by oxygen plasma treatment for 5 minutes (S1) and then spin-coated with the prepared interlayer material dope at 3,000 rpm for 40 seconds (S2).

A P3HT-b-P2VP block copolymer to be used as a polymer matrix was dissolved at 50 mg/mL in chloroform, and platinum oxide (FePt-OA nanoparticles and FePt-P3HT catalyst) prepared in Preparation Examples 1-4 and 1-5 above were added to this solution in a ratio of 10 wt % of the block copolymer (S3).

The reaction mixture prepared in step (S3) was drop-cast on PSS-coated silicon wafer (S4).

The silicon wafer obtained in step (S4) was dipped in a microwave vial containing 1 ml of tetrahydrofuran (THF) capable of effectively dissolving both P3HT and P2VP and annealed at a temperature of 180° C. for 10 minutes to obtain a conductive polymer matrix. The P2VP was selectively dyed by iodine vapor for observation (S5).

Figure 11:
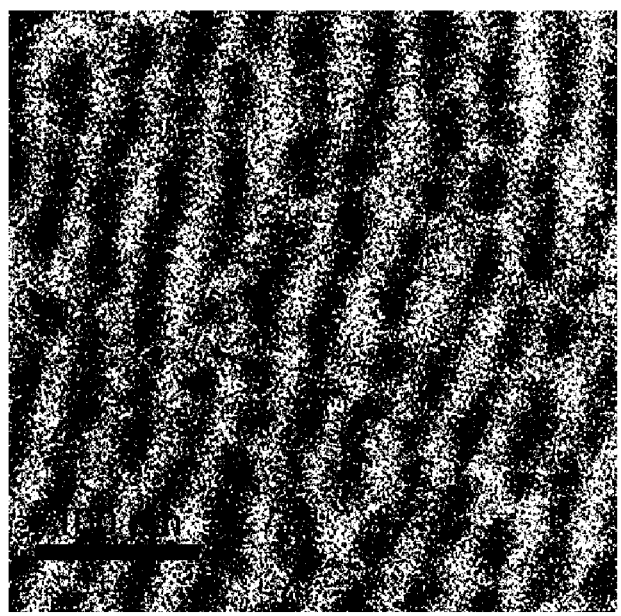
FIG. 11 is a TEM image showing morphology of an exemplary P3HT-b-P2VP block copolymer.

FIG. 11 is a TEM image of a conductive polymer matrix prepared from only a block copolymer without adding platinum oxide, which shows that P3HT-b-P2VP is aligned in the form of a lamellar structure.

The P3HT domain and P2VP domain having a lamellar shape have a thickness of about 36 nm. A relatively bright region represents a P3HT part non-dyed with iodine and a dark region represents a P2VP part dyed with iodine.

Control of Position of Catalyst in Conductive Polymer Matrix

Example 1

A conductive polymer matrix was prepared using FePt-P3HT synthesized in (Preparation Example 1-5) as platinum oxide in step (S3) of (Preparation Example 2).

A bulk sample of the prepared conductive polymer matrix was separated from the silicon wafer and then molded with epoxy.

Thin sections with a thickness of 50 nm were produced from the molded epoxy using an ultra-microtome, which is a machine for producing ultrathin sections, P2VP was selectively dyed with iodine vapor and morphology was observed by TEM.

Figure 13:
FIG. 13 is a TEM image showing dispersion of an exemplary FePt-P3HT catalyst in an exemplary P3HT-b-P2VP block copolymer.

As can be seen from FIG. 13, most FePt-P3HT is distributed at the interface between the bright P3HT domain and the dark P2VP domain constituting the conductive polymer matrix, thereby forming a three-phase structure, in which P3HT serving as an electron movement channel, P2VP serving as an ion movement channel, and FePt serving as a catalyst completely contact one another, which can maximize availability as an electrode.

This is due to the fact that the tension at the interface between P3HT and the FePt-P3HT catalyst having the same chemical structure as P3HT constituting the conductive polymer matrix is close to 0, and van der Waals force or the like occurring therebetween inhibits electrostatic interaction between the catalyst FePt and P2VP constituting the conductive polymer matrix.

Comparative Example 1

A conductive polymer matrix was prepared using FePt-OA synthesized in (Preparation Example 1-4) as platinum oxide in step (S3) of (Preparation Example 2).

A bulk sample of the prepared conductive polymer matrix was separated from the silicon wafer and then molded with epoxy.

Thin sections with a thickness of 50 nm were produced from the molded epoxy using an ultra-microtome, which is a machine for producing ultrathin sections, P2VP was selectively dyed with iodine vapor and morphology was observed by TEM.

Figure 12:
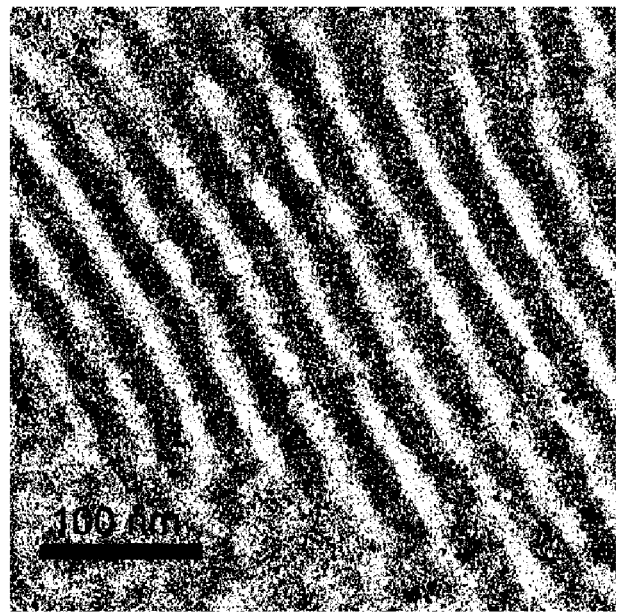
FIG. 12 is a TEM image showing dispersion an exemplary FePt-OA catalyst in an exemplary P3HT-b-P2VP block copolymer.

As can be seen from FIG. 12, most FePt-OA is agglomerated in a dark P2VP domain and is thus unsuitable for use as an electrode.

This may be caused by the interaction between the nitrogen atom of P2VP constituting the conductive polymer matrix that electrostatically may interact with an inorganic substance, and FePt particles of FePt-OA. In addition, the agglomeration may be due to the interaction between FePt-OA particles.

According to various exemplary embodiments of the present invention, metal nanoparticles having a conductive polymer shell through end substitution of a conductive polymer and surface-modification may be provided. When using this method, various hybrid nano-composites may be formed by a combination of other conductive polymers than P3HT with metal nanoparticles.

In particular, conventional nano-composites having normal polymer or monomer shells may not have electrical properties due to insulation effect. Platinum, which is used as a metal, may be helpful for catalytic activity in fuel cells. Furthermore, methods for selectively disposing metal nanoparticles in only a conductive polymer domain in two or more shapes of conductive polymer-based block copolymers may be provided.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An electrode for fuel cells comprising:
a polymer matrix; and
a catalyst dispersed in the polymer matrix,
wherein the catalyst has a core-shell structure comprising:
a core comprising metal nanoparticles; and
a shell comprising a conductive polymer,
wherein the core comprises one or more selected from the group consisting of platinum (Pt), gold (Au), tin (Sn), copper (Cu), nickel (Ni), iron (Fe), cobalt (Co), zinc (Zn), titanium (Ti), chromium (Cr), manganese (Mn), iridium (Ir), tantalum (Ta), molybdenum (Mo), rhodium (Rh), osmium (Os), rhenium (Re), tungsten (W), vanadium (V), cadmium (Cd), selenium (Se), tellurium (Te), indium (In) and silver (Ag), and
wherein the conductive polymer comprises one or more selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylenevinylene (PPV), poly(2,5-dialkoxy)paraphenylenevinylene, polyparaphenylene (PPP), polyparaphenylene sulfide (PPS), polyheptadiene (PHT), poly(3-hexyl)thiophene (P3HT), polycarbazole and polyaniline (PANI).

2. The electrode for fuel cells of claim 1, wherein the catalyst comprises:
an amount of about 80% by weight to 90% by weight of the core; and
an amount of about 10% by weight to 20% by weight of the shell,
all % by weight based on the total weight of the catalyst.

3. The electrode for fuel cells of claim 1, wherein the polymer matrix comprises a block copolymer.

4. The electrode for fuel cells of claim 3, wherein the block copolymer is a copolymer comprising:
i) one or a more selected from the group consisting of polystyrene, nylon, polyethylene, polyisoprene, SBS rubber, polydicyclopentadiene, polytetrafluoroethylene, poly(phenylene sulfide), silicone, aramid, cellulose, rayon, poly(methyl methacrylate), poly(vinylidene chloride), poly(vinylidene fluoride), carbon fibers, polyisobutylene, polychloroprene, polybutadiene, poly(vinyl chloride), poly(vinyl acetate), polyvinylpyrrolidone, polycyanoacrylate, polyacrylonitrile, poly(arylene ethynyl ene), poly(phenylene ethynylene), polyaniline, polyphenylene, ethylene vinyl alcohol, fluoroplastic, ionomers, polyacrylate, polybutylene, chlorinated polyethylene, polymethylpentene, polypropylene, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, polyethylene terephthalate, an epoxy resin, polyurethane, polyvinylpyridine and polylactide; and
ii) one or more selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylene vinylene (PPV), poly(2,5dialkoxy)paraphenylene vinylene, polyparaphenylene (PPP), polyparaphenylene sulfide (PPS), polyheptadiene (PHT), poly(3-hexyl)thiophene (P3HT), polycarbazole and polyaniline (PANI).

5. The electrode for fuel cells of claim 1, wherein the polymer matrix comprises:
a first region comprising an A block; and
a second region comprising a B block,
wherein the polymer matrix has a lamellar structure in which the first region and the second region are alternately disposed.

6. The electrode for fuel cells of claim 5, wherein:
the first region comprises one or more selected from the group consisting of polystyrene, nylon, polyethylene, polyisoprene, SBS rubber, polydicyclopentadiene, polytetrafluoroethylene, poly(phenylene sulfide), silicone, aramid, cellulose, rayon, poly(methyl methacrylate), poly(vinylidene chloride), poly(vinylidene fluoride), carbon fibers, polyisobutylene, polychloroprene, polybutadiene, poly(vinyl chloride), poly(vinyl acetate), polyvinylpyrrolidone, polycyanoacrylate, polyacrylonitrile, poly(arylene ethynylene), poly(phenylene ethynylene), polyaniline, polyphenylene, ethylene vinyl alcohol, fluoroplastic, ionomers, polyacrylate, polybutylene, chlorinated polyethylene, polymethylpentene, polypropylene, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, polyethylene terephthalate, an epoxy resin, polyurethane, polyvinylpyridine and polylactide; and the second region comprises one or more thereof selected from the group consisting of polytriphenylamine, polyacetylene (PA), polythiophene (PT), poly(3-alkyl)thiophene (P3AT), polypyrrole (PPY), polyisothianapthelene (PITN), polyethylene dioxythiophene (PEDOT), polyparaphenylene vinylene (PPV), poly(2,5-dialkoxy) paraphenylene vinylene, polyparaphenylene (PPP), polyparaphenylene sulfide (PPS), polyheptadiene (PHT), poly(3-hexyl)thiophene (P3HT), polycarbazole and polyaniline (PANI).

7. The electrode for fuel cells of claim 5, wherein the catalyst is disposed at an interface between the first region and the second region.

8. The electrode for fuel cells of claim 1, wherein the electrode comprises:
an amount of about 80% by weight to 90% by weight of the polymer matrix; and
an amount of about 10% by weight to 20% by weight of the catalyst,
% by weight based on the total weight of the electrode.

* * * * *